(12) United States Patent
Zhang

(10) Patent No.: US 9,433,044 B2
(45) Date of Patent: Aug. 30, 2016

(54) LED BACKLIGHT SOURCES FOR LIQUID CRYSTAL DEVICES AND LIQUID CRYSTAL DEVICES

(71) Applicant: Shenzhen China Star Optoelectronics Technology Co., Ltd., Shenzhen, Guangdong (CN)

(72) Inventor: Hua Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 24 days.

(21) Appl. No.: 14/395,062

(22) PCT Filed: Sep. 11, 2014

(86) PCT No.: PCT/CN2014/086315
§ 371 (c)(1),
(2) Date: Oct. 16, 2014

(87) PCT Pub. No.: WO2016/029512
PCT Pub. Date: Mar. 3, 2016

(65) Prior Publication Data
US 2016/0066373 A1    Mar. 3, 2016

(30) Foreign Application Priority Data

Aug. 26, 2014 (CN) .......................... 2014 1 0427012

(51) Int. Cl.
*H05B 33/08* (2006.01)
*G09G 3/34* (2006.01)
*G02F 1/1335* (2006.01)

(52) U.S. Cl.
CPC ......... *H05B 33/0815* (2013.01); *G02F 1/1336* (2013.01); *G09G 3/3406* (2013.01); *H05B 33/083* (2013.01); *H05B 33/0887* (2013.01); *G09G 2320/064* (2013.01)

(58) Field of Classification Search
CPC ............ H05B 33/0815; H05B 33/083; H05B 33/0887; G02F 1/1336; G09G 3/34; G09G 3/06

USPC .......................................................... 315/307
See application file for complete search history.

(56) References Cited

U.S. PATENT DOCUMENTS

| | | | | | |
|---|---|---|---|---|---|
| 8,569,975 | B2* | 10/2013 | Uchimoto | ............ | G09G 3/3406 315/210 |
| 8,692,477 | B1* | 4/2014 | Lee | .................... | H05B 33/0815 315/185 S |
| 2009/0302776 | A1* | 12/2009 | Szczeszynski | ..... | H05B 33/0815 315/246 |
| 2013/0293109 | A1* | 11/2013 | Cheon | ................ | H05B 33/0887 315/122 |
| 2014/0218657 | A1* | 8/2014 | Haruta | .................. | G09G 3/342 349/61 |
| 2015/0289325 | A1* | 10/2015 | Szolusha | ................ | H05B 33/08 315/201 |

FOREIGN PATENT DOCUMENTS

| CN | 101086571 A | 12/2007 |
|---|---|---|
| CN | 103065589 A | 4/2013 |

* cited by examiner

*Primary Examiner* — Dylan White
(74) *Attorney, Agent, or Firm* — Andrew C. Cheng

(57) ABSTRACT

The LED backlight source includes a boost circuit, a current control module, a voltage detection circuit. The boost circuit is configured for boosting an input voltage to an operation voltage needed by a LED string. The current control module connects to a negative end of the LED string to adjust an operation current of the LED string. The voltage detection circuit is configured for detecting whether the input voltage has been decreased, and for providing a control signals to a backlight driving control circuit upon determining the input voltage has been decreased. The backlight driving control circuit is configured for providing first square-wave signals to the boost circuit for boosting the voltage, for providing second square-wave signals to the current control module for adjusting a current, and for decreasing an input current upon receiving the control signals from the voltage detection circuit.

11 Claims, 3 Drawing Sheets

LED BACKLIGHT SOURCES FOR LIQUID CRYSTAL DEVICES AND LIQUID CRYSTAL DEVICES

BACKGROUND OF THE INVENTION

1. Field of the Invention

The present disclosure relates to liquid crystal display technology, and more particularly to a LED backlight source for liquid crystal devices (LCDs) and the LCDs.

2. Discussion of the Related Art

With the development of the display technology, the backlight solutions have been greatly enhanced. CCFL is one of the conventional backlight sources of LCDs. However, as the CCFL backlight is characterized by attributes including low color reduction ability, low lighting efficiency, high discharging voltage, bad discharging characteristics in low temperature, and also, the CCFL needs a long time to achieve a stable gray scale, LED backlight source is a newly developed technology.

FIG. 1 is a circuit diagram of one conventional LED backlight source of LCDs. As shown, the LED backlight source includes a boost circuit, a backlight driving control circuit, and a LED string. The boost circuit includes an inductor (L), a rectifier diode (D1), a first MOS transistor (Q1), a capacitor (C), and a first resistor (R1). One end of the inductor (L) receives the input voltage (Vin). The other end of the inductor (L) connects to a positive end of the rectifier diode (D1) and to a drain of the first MOS transistor (Q1). A gate of the first MOS transistor (Q1) is driven by a first square-wave signals (PWM1) provided by the backlight driving control circuit. A source of the first MOS transistor (Q1) is electrically grounded via the first resistor (R1). A negative end of the rectifier diode (D1) receives the output voltage (Vout) and provides the output voltage (Vout) to the LED string. The negative end of the rectifier diode (D1) is electrically grounded via the capacitor (C). The negative end of the LED string also connects to a second MOS transistor (Q2). The drain of the second MOS transistor (Q2) connects to the negative end of the LED string. The source of the second MOS transistor (Q2) is electrically grounded via a third resistor (R3). A gate of the second MOS transistor (Q2) is driven by a second square-wave signals (PWM2) provided by the backlight driving control circuit. The operation current of the LED string may be increased or decreased by changing the duty-cycle ratio of the second square-wave signals (PWM2). In addition, the backlight driving control circuit also includes a second resistor (R2) for ensuring the driving frequency of the first square-wave signals (PWM1) provided to the gate of the first MOS transistor (Q1).

When the power supply of the LCD is cut off, the input voltage (Vin) of the LED backlight source is decreased until being equal to zero. The backlight driving control circuit may not terminate its operation immediately due to the capacitor and a larger power supply range of the backlight driving control circuit. However, during this time period, the output voltage (Vout) of the LED string remains the same. It may cause the duty-cycle ratio of the first square-wave signals (PWM1) provided to the gate of the first MOS transistor (Q1) may increase as the input voltage (Vin) has been decreased. For this reason, the energy-saving time (D×T) within the operation period (T) of the first square-wave signals (PWM1) for the inductor (L) is increased, which results in an increased maximum current for the inductor (L) and an increased input current (Iin) of the LED backlight source. As such, The sharply input current may damage the electrical components with in the LED backlight source.

SUMMARY

In one aspect, a backlight module includes: a light guiding plate including at least one light incident surface; a light source unit being arranged close to the light incident surface; and a light conversion unit being fixed between the light source unit and the light incident surface, and the light conversion unit converts light beams emitted from the light source unit to white light beams.

In one aspect, a LED backlight source for LCD includes: a boost circuit for boosting an input voltage to an operation voltage needed by a LED string; a current control module connecting to an negative end of the LED string to adjust an operation current of the LED string; a voltage detection circuit for detecting whether the input voltage has been decreased, and for providing a control signals to a backlight driving control circuit upon determining the input voltage has been decreased; and the backlight driving control circuit is configured for providing a first square-wave signals to the boost circuit for boosting the voltage, for providing a second square-wave signals to the current control module for adjusting a current, and for decreasing an input current upon receiving the control signals from the voltage detection circuit.

Wherein the voltage detection circuit includes: a divider configured for dividing the input voltage to generate a comparing voltage; a comparator configured for comparing the comparing voltage and the reference voltage; and a frequency adjusting circuit configured for controlling the backlight driving control circuit to increase the frequency of the first square-wave signals to be provided to the boost circuit upon determining the comparing voltage is smaller than the reference voltage so as to decreased the input current.

Wherein the divider includes a first resistor and as second resistor, one end of the first resistor is for receiving the input voltage, the other end of the first resistor connects to one end of the second resistor and to a negative input end of the comparator, and the other end of the second resistor is electrically grounded.

Wherein the frequency adjusting circuit includes a second MOS transistor, a third resistor, and a fourth resistor, a gate of the second MOS transistor connects to an output end of the comparator, a drain of the second MOS transistor connects to one end of the third resistor and to the backlight driving control circuit, the source of the second MOS transistor connects to one end of the fourth resistor, and the other end of the third resistor and the other end of the fourth resistor are electrically grounded.

Wherein the frequency adjusting circuit includes a second MOS transistor, a third resistor, and a fourth resistor, a gate of the second MOS transistor connects to an output end of the comparator, a drain of the second MOS transistor connects to one end of the third resistor and to the backlight driving control circuit, the source of the second MOS transistor connects to one end of the fourth resistor, and the other end of the third resistor and the other end of the fourth resistor are electrically grounded.

Wherein the voltage detection circuit includes: a divider configured for dividing the input voltage to generate a comparing voltage; a micro controller unit (MCU) configured for detecting whether the comparing voltage has been decreased; and the MCU controls the backlight driving control circuit to decrease a duty-cycle ratio of the second square-wave signals to be provided to the current control module upon determining the comparing voltage has been decreased so as to decrease the operation current of the LED string and the input current.

Wherein the divider includes a first resistor and as second resistor, one end of the first resistor is for receiving the input voltage, the other end of the first resistor connects to one end of the second resistor and to the MCU, and the other end of the second resistor is electrically grounded.

Wherein the boost circuit includes: an inductor, a first MOS transistor, a rectifier diode, and a capacitor; and wherein one end of the inductor is configured for receiving the input voltage, and the other end of the inductor connects to an positive end of the rectifier diode and to a drain of the first MOS transistor, a negative end of the rectifier diode connects to a positive end of the LED string and to one end of the capacitor, a gate of the first MOS transistor connects to the backlight driving control circuit, and a source of the first MOS transistor and the other end of the capacitor are electrically grounded.

Wherein the current control module includes a third MOS transistor and a fifth resistor, a gate of the third MOS transistor connects to the backlight driving control circuit, a drain of the third MOS transistor connects to a negative end of the LED string, a source of the third MOS transistor connects to one end of the fifth resistor 122, and the other end of the fifth resistor is electrically grounded.

Wherein the LED string includes a predetermined number of LEDs.

In another aspect, a LCD includes a liquid crystal panel and a backlight module arranged opposite to the liquid crystal panel, the backlight module provides a display light source to the liquid crystal panel such that the liquid crystal panel is capable of displaying images, the backlight module includes the above LED backlight source.

In view of the above, the input current of the LED backlight source is decreased when the power supply of the LCD is cut off. As such, the electrical components are prevented from being damaged by the sharply input current.

DETAILED DESCRIPTION OF THE EMBODIMENTS

Figure 1:
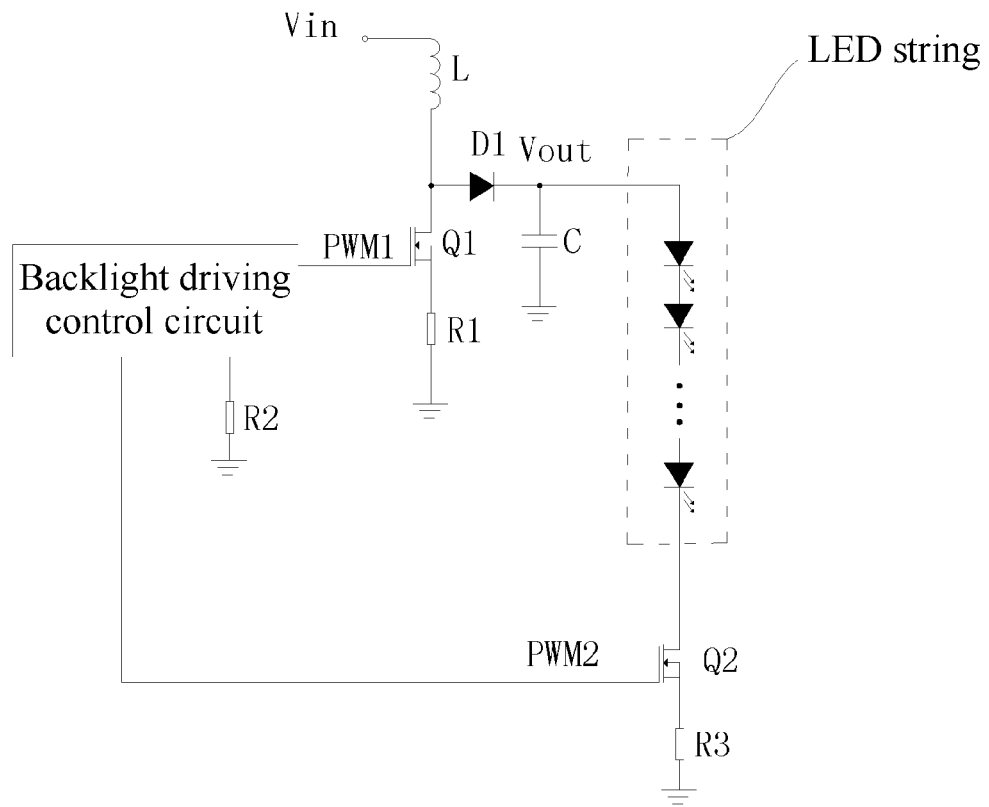
FIG. 1 is a circuit diagram of one conventional LED backlight source of LCDs.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 2:
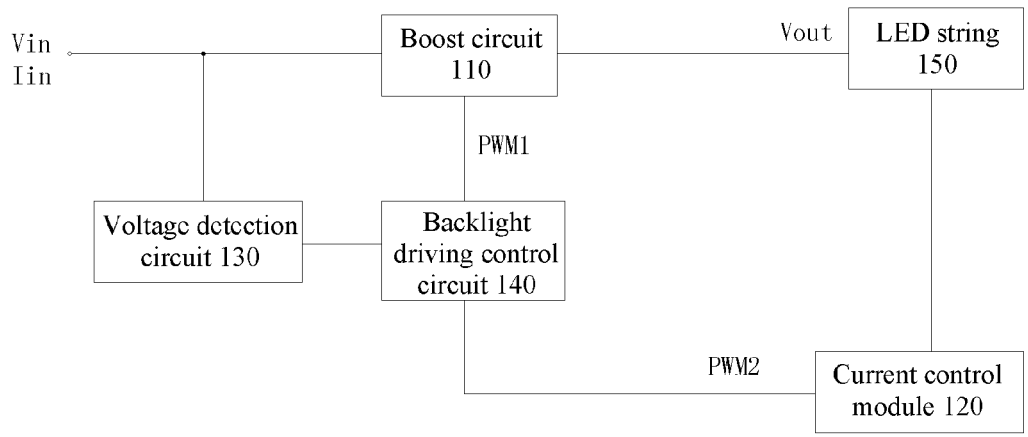
FIG. 2 is a block diagram of the LED backlight source of the LCD in accordance with a first embodiment.
Figure 3:
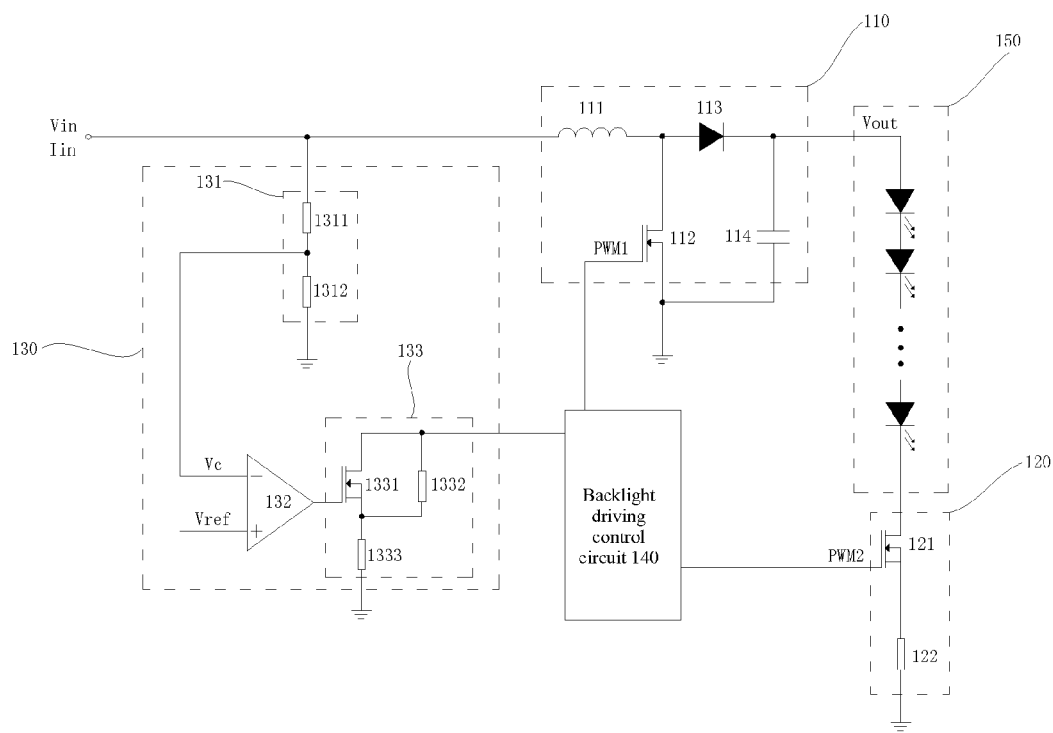
FIG. 3 is a circuit diagram of the LED backlight source of the LCD in accordance with a first embodiment.

FIG. 2 is a block diagram of the LED backlight source of the LCD in accordance with a first embodiment. FIG. 3 is a circuit diagram of the LED backlight source of the LCD in accordance with a first embodiment.

Referring to FIGS. 2 and 3, the LED backlight source includes a boost circuit 110, a current control module 120, a voltage detection circuit 130, a backlight driving control circuit 140, and a LED string 150.

Specifically, the boost circuit 110 may be an inductor-boost circuit for boosting an input voltage (Vin) to an operation voltage needed by the LED string 150. The boost circuit 110 includes an inductor 111, a first MOS transistor 112, a rectifier diode 113, and a capacitor 114. In the embodiment, one end of the inductor 111 is configured for receiving the input voltage (Vin), and the other end of the inductor 111 connects to an positive end of the rectifier diode 113 and to a drain of the first MOS transistor 112. A negative end of the rectifier diode 113 connects to the positive end of the LED string 150 and to one end of the capacitor 114. The gate of the first MOS transistor 112 connects to the backlight driving control circuit 140. The source of the first MOS transistor 112 and the other end of the capacitor 114 are electrically grounded. It can be understood that the boost circuit is not limited to the boost circuit 110 of FIG. 3.

Within the boost circuit 110, the inductor 111 is the energy conversion component for converting the electrical and magnetic energy. The gate of the first MOS transistor 112 receives the high-level signals of a first square-wave signals (PWM1) provided by the backlight driving control circuit 140, and then the inductor 111 converts the electrical energy to the magnetic energy and saves the magnetic energy. In addition, the electrical energy and the input voltage (Vin) are overlapped and then are filtered by the rectifier diode 113 and the capacitor 114 so as to obtain a direct current (DC) voltage working as the operation voltage needed by the LED string 150. As the DC voltage is overlapped by electrical energy converted from the magnetic energy of the input voltage (Vin) and the inductor 111, the DC has to be larger than the input voltage (Vin).

The LED string 150 operates as the backlight source of the LCD. The LED string 150 includes a predetermined number of LEDs that are serially connected. The LED string 150 receives the needed operation voltage from the boost circuit 110. The number of the LEDs within the LED string 150 (N) satisfies the equation below, wherein N is an integer larger than zero.

$$N \times Vd \leq Vs;$$

Wherein Vd represents a light-emitting voltage of each LEDs, and Vs represents the needed operation voltage of the LED string 150 received from the boost circuit 110.

For instance, when Vd equals to 6.5V, Vs equals to 24V, N≤3.

The current control module 120 connects to the negative end of the LED string 150 to adjust the operation current of the LED string 150. The current control module 120 includes a third MOS transistor 121 and a fifth resistor 122. The gate of the third MOS transistor 121 connects to the backlight driving control circuit 140. The drain of the third MOS transistor 121 connects to the negative end of the LED string 150. The source of the third MOS transistor 121 connects to one end of the fifth resistor 122. The other end of the fifth resistor 122 is electrically grounded.

The gate of the third MOS transistor 121 receives a second square-wave signals (PWM2). The backlight driving control circuit 140 increases or decreases the operation current of the LED string 150 by changing a duty-cycle ratio of the second square-wave signals (PWM2). In the embodiment, the operation current of the LED string 150 remains constant.

The voltage detection circuit 130 is configured for detecting whether the input voltage (Vin) has been decreased. For instance, when the power supply of the LCD is cut off, the input voltage (Vin) provided toward the LED backlight source is decreased until equaling to zero. The voltage detection circuit 130 provides a control signals upon determining the input voltage (Vin) is decreased. In the embodiment, the voltage detection circuit 130 includes a divider 131, a comparator 132, and a frequency adjusting circuit 133.

The divider 131 is configured for dividing the input voltage (Vin) to generate a comparing voltage (Vc). The divider 131 includes a first resistor 1311 and a second resistor 1312. One end of the first resistor 1311 is for receiving the input voltage (Vin). The other end of the first resistor 1311 connects to one end of the second resistor 1312 and to a negative input end of the comparator 132. The other end of the second resistor 1312 is electrically grounded.

The comparator 132 is configured for comparing the comparing voltage (Vc) and the reference voltage (Vref). The negative input end of the comparator 132 connects to the other end of the first resistor 1311. An positive input end of the comparator 132 is configured for receiving the reference voltage (Vref). The output end of the comparator 132 connects to the gate of a second MOS transistor 1331 of the frequency adjusting circuit 133. It is to be noted that the reference voltage (Vref) equals to the comparing voltage (Vc) during normal operation of the LCD.

The frequency adjusting circuit 133 is configured for controlling the backlight driving control circuit 140. When the comparing voltage (Vc) is smaller than the reference voltage (Vref), the backlight driving control circuit 140 increases the frequency of the first square-wave signals (PWM1) to be provided to the gate of the first MOS transistor 112 of the boost circuit 110. As such, an input current (Iin) is decreased. The frequency adjusting circuit 133 includes the second MOS transistor 1331, a third resistor 1332, and a fourth resistor 1333. The gate of the second MOS transistor 1331 connects to the output end of the comparator 132. The drain of the second MOS transistor 1331 connects to one end of the third resistor 1332 and to the backlight driving control circuit 140. The source of the second MOS transistor 1331 connects to one end of the fourth resistor 1333. The other end of the third resistor 1332 and the other end of the fourth resistor 1333 are electrically grounded.

The process of increasing the frequency of the first square-wave signals (PWM1) as stated above will be described hereinafter.

During normal operations, the input voltage (Vin) and the comparing voltage (Vc) remains the same or stable, wherein Vc=Vin×R2/(R1+R2). R1 represents the resistance value of the first resistor 1311, R2 represents the resistance value of the second resistor 1312. As the reference voltage (Vref) equals to the comparing voltage (Vc), the output voltage of the output end of the comparator 132 is zero. The frequency of the first square-wave signals (PWM1) is inversely proportional to the resistance value (R3) of the third resistor 1332. The first square-wave signals (PWM1) is provided by the backlight driving control circuit 140 to the gate of the first MOS transistor 112 of the boost circuit 110. When the gate of the second MOS transistor 1331 receives the low-level signals, the second MOS transistor 1331 is turned off. In addition, the resistance value (R3) of the third resistor 1332, the frequency of the first square-wave signals (PWM1), and the input current (Iin) remains the same.

In one embodiment, when the LCD is power off, the LED backlight source has to operate with a constant power, and thus the input voltage (Vin) and the comparing voltage (Vc) decrease, where Vc=Vin×R2/(R1+R2). At this moment, reference voltage (Vref) is larger than the comparing voltage (Vc). The output end of the comparator 132 outputs the high voltage. The gate of the second MOS transistor 1331 receives the high-level signals to turn on the second MOS transistor 1331. The third resistor 1332 and the fourth resistor 1333 are connected in parallel. The frequency of the first square-wave signals (PWM1) is inversely proportional to the resistance value (R3×R4/(R3+R4)) of the third resistor 1332 and the fourth resistor 1333 connected in parallel, wherein R4 represents the resistance value of the fourth resistor 1333. As the resistance value (R3×R4/(R3+R4)) is larger than the resistance value (R3), the frequency of the first square-wave signals (PWM1) increases. In other words, the operation period (T) of the first square-wave signals (PWM1) decreases. The energy-saving time (D×T) of the inductor 111 within the operation period (T) of the first square-wave signals (PWM1) decreases. Also, the maximum current of the inductor 111 greatly decreases, and the input current (Iin) also decreases, which prevents the electrical components from being damaged by the sharply input current.

Figure 4:
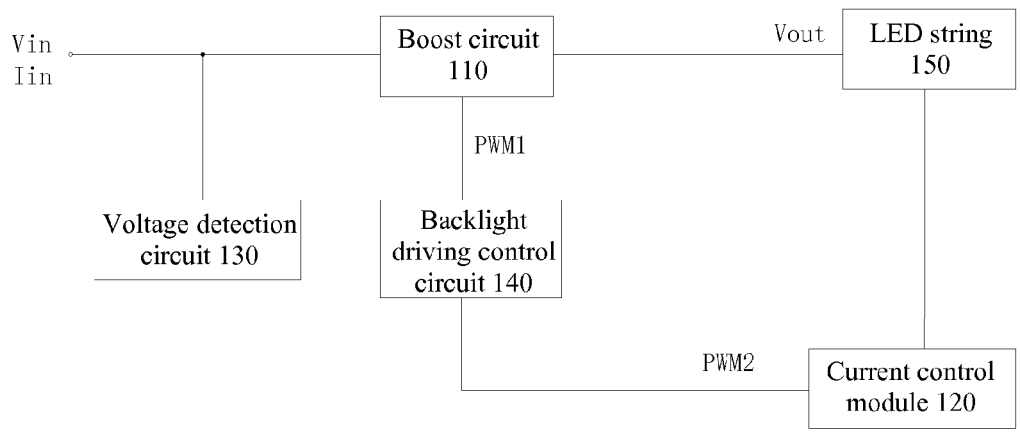
FIG. 4 is a block diagram of the LED backlight source of the LCD in accordance with the second embodiment.
Figure 5:
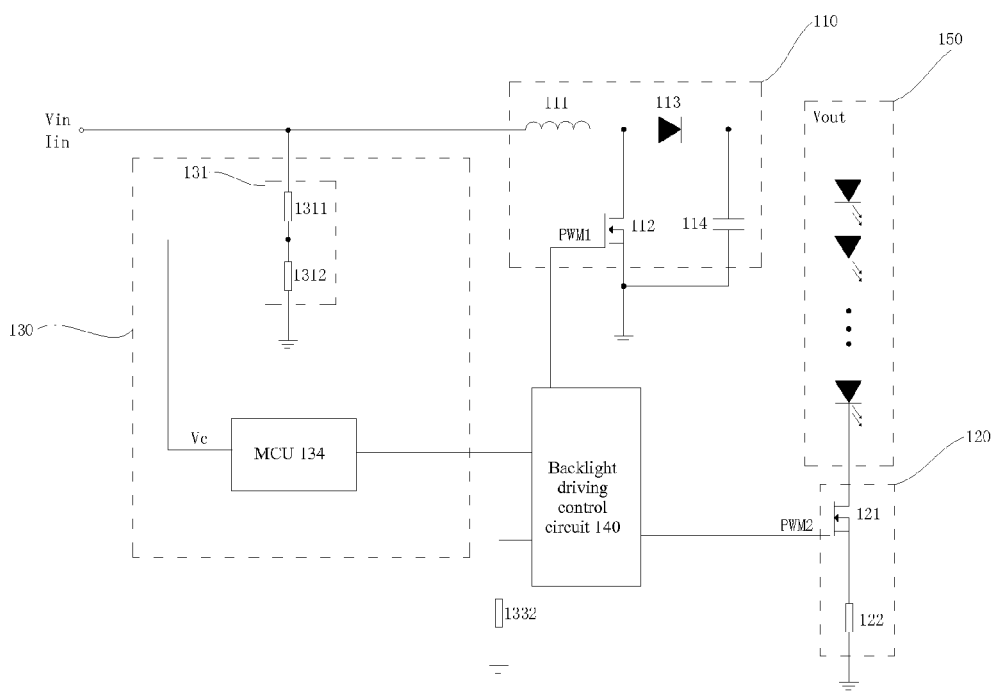
FIG. 5 is a circuit diagram of the LED backlight source of the LCD in accordance with the second embodiment.

FIG. 4 is a block diagram of the LED backlight source of the LCD in accordance with the second embodiment. FIG. 5 is a circuit diagram of the LED backlight source of the LCD in accordance with the second embodiment.

Referring to FIGS. 4 and 5, the LED backlight source in the second embodiment includes the boost circuit 110, the current control module 120, the voltage detection circuit 130, the backlight driving control circuit 140, and the LED string 150.

Specifically, the boost circuit 110 may be an inductor-boost circuit for boosting an input voltage (Vin) to an operation voltage needed by the LED string 150. The boost circuit 110 includes an inductor 111, a first MOS transistor 112, a rectifier diode 113, and a capacitor 114. In the embodiment, one end of the inductor 111 is configured for receiving the input voltage (Vin), and the other end of the inductor 111 connects to an positive end of the rectifier diode 113 and to a drain of the first MOS transistor 112. A negative end of the rectifier diode 113 connects to the positive end of the LED string 150 and to one end of the capacitor 114. The gate of the first MOS transistor 112 connects to the backlight driving control circuit 140. The drain of the first MOS transistor 112 and the other end of the capacitor 114 are electrically grounded. It can be understood that the boost circuit is not limited to the boost circuit 110 of FIG. 3.

Within the boost circuit 110, the inductor 111 is the energy conversion component for converting the electrical and magnetic energy. The gate of the first MOS transistor 112 receives the high-level signals of a first square-wave signals (PWM1) provided by the backlight driving control circuit 140, and then the inductor 111 converts the electrical energy to the magnetic energy and saves the magnetic energy. In addition, the electrical energy and the input voltage (Vin) are overlapped and then are filtered by the rectifier diode 113 and the capacitor 114 so as to obtain a direct current (DC) voltage working as the operation voltage needed by the LED string 150. As the DC voltage is overlapped by electrical energy converted from the magnetic energy of the input voltage (Vin) and the inductor 111, the DC has to be larger than the input voltage (Vin).

The LED string 150 operates as the backlight source of the LCD. The LED string 150 includes a predetermined number of LEDs that are serially connected. The LED string 150 receives the needed operation voltage from the boost circuit 110. The number of the LEDs within the LED string 150 (N) satisfies the equation below, wherein N is an integer larger than zero.

$$N \times Vd \leq Vs;$$

Wherein Vd represents a light-emitting voltage of each LEDs, and Vs represents the needed operation voltage of the LED string 150 received from the boost circuit 110.

For instance, when Vd equals to 6.5V, Vs equals to 24V, N≤3.

The current control module 120 connects to the negative end of the LED string 150 to adjust the operation current of the LED string 150. The current control module 120 includes a third MOS transistor 121 and a fifth resistor 122. The gate of the third MOS transistor 121 connects to the backlight driving control circuit 140. The drain of the third MOS transistor 121 connects to the negative end of the LED string 150. The source of the third MOS transistor 121 connects to one end of the fifth resistor 122. The other end of the fifth resistor 122 is electrically grounded.

The gate of the third MOS transistor 121 receives a second square-wave signals (PWM2). The backlight driving control circuit 140 increases or decreases the operation current of the LED string 150 by changing a duty-cycle ratio of the second square-wave signals (PWM2). In the embodiment, the operation current of the LED string 150 remains constant.

The voltage detection circuit 130 is configured for detecting whether the input voltage (Vin) is decreased. For instance, when the power supply of the LCD is cut off, the input voltage (Vin) provided toward the LED backlight source is decreased until equaling to zero. The voltage detection circuit 130 provides a control signals upon determining the input voltage (Vin) is decreased. In the embodiment, the voltage detection circuit 130 includes a divider 131, and a micro controller unit (MCU) 134.

The divider 131 is configured for dividing the input voltage (Vin) to generate a comparing voltage (Vc). The divider 131 includes a first resistor 1311 and a second resistor 1312. One end of the first resistor 1311 is for receiving the input voltage (Vin). The other end of the first resistor 1311 connects to one end of the second resistor 1312 and to the MCU 134. The other end of the second resistor 1312 is electrically grounded.

The MCU 134 is configured for detecting whether the comparing voltage (Vc) has been decreased. The MCU 134 controls the backlight driving control circuit 140 to decrease the duty-cycle ratio of the second square-wave signals (PWM2) to be provided to the current control module 120. As such, the operation current of the LED string 150 is decreased so as to decrease the input current (Iin).

The process of increasing the frequency of the second square-wave signals (PWM2) as stated above will be described hereinafter.

During normal operations, the input voltage (Vin) and the comparing voltage (Vc) remains the same or stable, wherein Vc=Vin×R2/(R1+R2). R1 represents the resistance value of the first resistor 1311, R2 represents the resistance value of the second resistor 1312. At this moment, the duty-cycle ratio of the second square-wave signals (PWM2) of the current control module 120 provided by the backlight driving control circuit 140 is controlled to be the same as the backlight driving control circuit 140 is controlled by the MCU 134. In addition, the operation current of the LED string 150 and the input current (Iin) remain the same.

In one embodiment, when the LCD is power off, the LED backlight source has to operate with a constant power, and thus the input voltage (Vin) and the comparing voltage (Vc) decrease, where Vc=Vin×R2/(R1+R2). At this moment, the duty-cycle ratio of the second square-wave signals (PWM2) of the current control module 120 provided by the backlight driving control circuit 140 is decreased in response to the control of the MCU 134. As such, the operation current of the LED string 150 and the input current (Iin) decrease, which prevents the electrical components from being damaged by the sharply input current.

Figure 6:
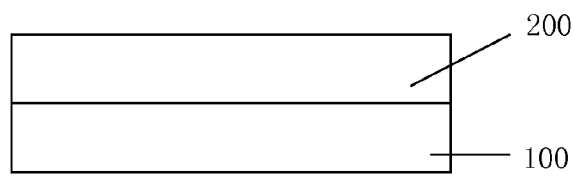
FIG. 6 is a schematic view of the LCD in accordance with one embodiment.

FIG. 6 is a schematic view of the LCD in accordance with one embodiment.

Referring to FIG. 6, the LCD includes a liquid crystal panel 200 and a backlight module 100 arranged opposite to the liquid crystal panel 200. The backlight module 100 provides a display light source to the liquid crystal panel 200 such that the liquid crystal panel 200 is capable of displaying images. The backlight module 100 may be the LED backlight source of the first or second embodiment.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A LED backlight source for LCD, comprising:

a boost circuit for boosting an input voltage to an operation voltage needed by a LED string;

a current control module connecting to an negative end of the LED string to adjust an operation current of the LED string;

a voltage detection circuit for detecting whether the input voltage has been decreased, and for providing a control signals to a backlight driving control circuit upon determining the input voltage has been decreased;

the backlight driving control circuit is configured for providing a first square-wave signals to the boost circuit for boosting the voltage, for providing a second square-wave signals to the current control module for adjusting a current, and for decreasing an input current upon receiving the control signals from the voltage detection circuit; and wherein the voltage detection circuit comprises:

a divider configured for dividing the input voltage to generate a comparing voltage;

a comparator configured for comparing the comparing voltage and the reference voltage; and a frequency adjusting circuit configured for controlling the backlight driving control circuit to increase the frequency of the first square-wave signals to be provided to the boost circuit upon determining the comparing voltage is smaller than the reference voltage so as to decreased the input current; and wherein the frequency adjusting circuit comprises a second MOS transistor, a third resistor, and a fourth resistor, a gate of the second MOS transistor connects to an output end of the comparator, a drain of the second MOS transistor connects to one end of the third resistor and to the backlight driving control circuit, the source of the second MOS transistor connects to one end of the fourth resistor, and the other end of the third resistor and the other end of the fourth resistor are electrically grounded.

2. The LED backlight source of claim 1, wherein the voltage detection circuit comprises:
a micro controller unit (MCU) configured for detecting whether the comparing voltage has been decreased; and
the MCU controls the backlight driving control circuit to decrease a duty-cycle ratio of the second square-wave signals to be provided to the current control module upon determining the comparing voltage has been decreased so as to decrease the operation current of the LED string and the input current.

3. The LED backlight source of claim 1, wherein the boost circuit comprises:
an inductor, a first MOS transistor, a rectifier diode, and a capacitor; and
wherein one end of the inductor is configured for receiving the input voltage, and the other end of the inductor connects to an positive end of the rectifier diode and to a drain of the first MOS transistor, a negative end of the rectifier diode connects to a positive end of the LED string and to one end of the capacitor, a gate of the first MOS transistor connects to the backlight driving control circuit, and a source of the first MOS transistor and the other end of the capacitor are electrically grounded.

4. The LED backlight source of claim 1, wherein the current control module comprises a third MOS transistor and a fifth resistor, a gate of the third MOS transistor connects to the backlight driving control circuit, a drain of the third MOS transistor connects to a negative end of the LED string, a source of the third MOS transistor connects to one end of the fifth resistor 122, and the other end of the fifth resistor is electrically grounded.

5. The LED backlight source of claim 1, wherein the LED string comprises a predetermined number of LEDs.

6. A liquid crystal device (LCD), comprising:
a liquid crystal panel and a backlight module arranged opposite to the liquid crystal panel, the backlight module provides a display light source to the liquid crystal panel such that the liquid crystal panel is capable of displaying images, the backlight module comprises a LED backlight source, the LED backlight source comprises:
a boost circuit for boosting an input voltage to an operation voltage needed by a LED string;
a current control module connecting to an negative end of the LED string to adjust an operation current of the LED string;
a voltage detection circuit for detecting whether the input voltage has been decreased, and for providing a control signals to a backlight driving control circuit upon determining the input voltage has been decreased;
the backlight driving control circuit is configured for providing a first square-wave signals to the boost circuit for boosting the voltage, for providing a second square-wave signals to the current control module for adjusting a current, and for decreasing an input current upon receiving the control signals from the voltage detection circuit; and
wherein the voltage detection circuit comprises:
a divider configured for dividing the input voltage to generate a comparing voltage;
a comparator configured for comparing the comparing voltage and the reference voltage; and
a frequency adjusting circuit configured for controlling the backlight driving control circuit to increase the frequency of the first square-wave signals to be provided to the boost circuit upon determining the comparing voltage is smaller than the reference voltage so as to decreased the input current; and
wherein the frequency adjusting circuit comprises a second MOS transistor, a third resistor, and a fourth resistor, a gate of the second MOS transistor connects to an output end of the comparator, a drain of the second MOS transistor connects to one end of the third resistor and to the backlight driving control circuit, the source of the second MOS transistor connects to one end of the fourth resistor, and the other end of the third resistor and the other end of the fourth resistor are electrically grounded.

7. The LED backlight source of claim 6, wherein the voltage detection circuit comprises:
a micro controller unit (MCU) configured for detecting whether the comparing voltage has been decreased; and
the MCU controls the backlight driving control circuit to decrease a duty-cycle ratio of the second square-wave signals to be provided to the current control module upon determining the comparing voltage has been decreased so as to decrease the operation current of the LED string and the input current.

8. The LED backlight source of claim 6, wherein the boost circuit comprises:
an inductor, a first MOS transistor, a rectifier diode, and a capacitor; and
wherein one end of the inductor is configured for receiving the input voltage, and the other end of the inductor connects to an positive end of the rectifier diode and to a drain of the first MOS transistor, a negative end of the rectifier diode connects to a positive end of the LED string and to one end of the capacitor, a gate of the first MOS transistor connects to the backlight driving control circuit, and a source of the first MOS transistor and the other end of the capacitor are electrically grounded.

9. The LED backlight source of claim 6, wherein the current control module comprises a third MOS transistor and a fifth resistor, a gate of the third MOS transistor connects to the backlight driving control circuit, a drain of the third MOS transistor connects to a negative end of the LED string, a source of the third MOS transistor connects to one end of the fifth resistor 122, and the other end of the fifth resistor is electrically grounded.

10. The LED backlight source of claim 6, wherein the LED string comprises a predetermined number of LEDs.

11. A LED backlight source for LCD, comprising:
a boost circuit for boosting an input voltage to an operation voltage needed by a LED string;
a current control module connecting to an negative end of the LED string to adjust an operation current of the LED string;
a voltage detection circuit for detecting whether the input voltage has been decreased, and for providing a control signals to a backlight driving control circuit upon determining the input voltage has been decreased; and
the backlight driving control circuit is configured for providing a first square-wave signals to the boost circuit for boosting the voltage, for providing a second square-wave signals to the current control module for adjusting a current, and for decreasing an input current upon receiving the control signals from the voltage detection circuit;

wherein the voltage detection circuit comprises:
a divider configured for dividing the input voltage to generate a comparing voltage;
a comparator configured for comparing the comparing voltage and the reference voltage; and
a frequency adjusting circuit configured for controlling the backlight driving control circuit to increase the frequency of the first square-wave signals to be provided to the boost circuit upon determining the comparing voltage is smaller than the reference voltage so as to decreased the input current; and
wherein the divider comprises a first resistor and as second resistor, one end of the first resistor is for receiving the input voltage, the other end of the first resistor connects to one end of the second resistor and to a negative input end of the comparator, and the other end of the second resistor is electrically grounded.

* * * * *